D. T. BENTLEY.
AIR GAUGE.
APPLICATION FILED NOV. 15, 1920.
1,405,706.
Patented Feb. 7, 1922.
Fig. 1
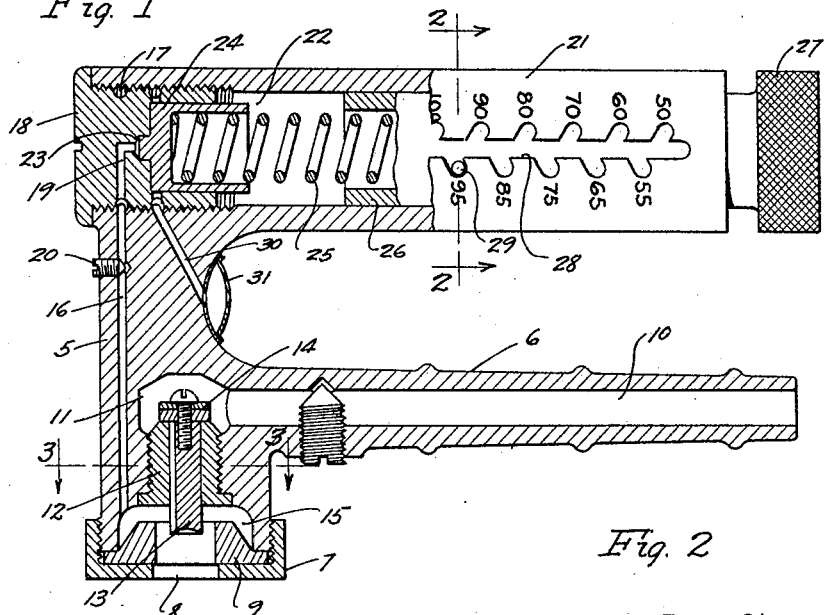
Fig. 2
Fig. 3
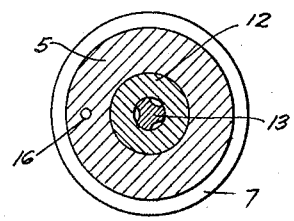
Fig. 4
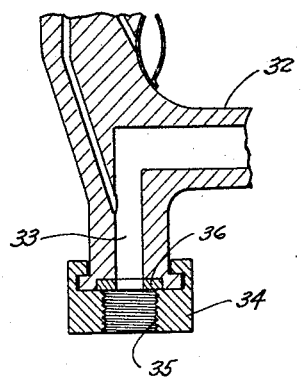
Inventor
Dozier T. Bentley
by Nestall and Wallace
his Attorneys

UNITED STATES PATENT OFFICE.

DOZIER THORNTON BENTLEY, OF SACRAMENTO, CALIFORNIA, ASSIGNOR OF ONE-HALF TO ALINE E. BENTLEY AND ONE-HALF TO FRANK W. GALVERY, BOTH OF SACRAMENTO, CALIFORNIA.

AIR GAUGE.

1,405,706.  Specification of Letters Patent.  Patented Feb. 7, 1922.

Application filed November 15, 1920. Serial No. 424,266.

*To all whom it may concern:*

Be it known that I, DOZIER THORNTON BENTLEY, a citizen of the United States, residing at Sacramento, in the county of Sacramento and State of California, have invented new and useful Improvements in an Air Gauge, of which the following is a specification.

This invention relates to an air gauge which will give an audible signal when the air pressure applied thereto has reached a selected magnitude. The invention is especially adapted for use in the inflation of automobile tires and the like.

It is an object of this invention to provide a gauge having means for expeditiously and easily adjusting it for operation at selected pressures. It is another object of this invention to provide certain details of structure whereby a positively operating structure, durable, and strong, may be obtained.

These objects will be more fully understood, as will also other objects and corresponding accomplishments of my invention from the following detailed description of a preferred embodiment thereof.

For the purpose of this description, reference is had to the accompanying drawings, in which:

Fig. 1 is an axial section through a gauge adapted to be placed over the ordinary tire valve; Fig. 2 is a section as seen on the line 2—2 of Fig. 1; Fig. 3 is a section as seen on the line 3—3 of Fig. 1; and Fig. 4 is a fragmentary section through a type of gauge adapted to be screwed to the tire valve tube so that the device may be used with a hand pump.

Referring more particularly to Figs. 1, 2, and 3, the body of the gauge is indicated by 5 and is provided with a nipple connection 6, whereby the hose leading to the source of air pressure may be attached. The lower end of the body 5 is cylindrical and has external threads, whereby a cap 7 may be mounted thereon. The cap is provided with an opening 8 at the center thereof for entrance of the tire valve stem. Clamped between the cover 7 and the body is a rubber gasket 9 having an opening registering with opening 8 in the cap. The bore 10 of the nipple communicates with a chamber 11 closed at the lower side by a plug seat 12 threaded in the body and having a port extending through the center thereof, in which is slidably disposed a valve stem 13. Secured to the top of the valve stem is a disk 14, which may be held in position by a suitable screw and washer. Below the plug 12 is a chamber 15, and communicating therewith is an air passage 16 leading to an annular channel 17 in a plug 18 provided with a duct 19 communicating with the channel. A needle set screw 20 regulates the passage of air through the port 16 to the channel 17.

The body 5 has an extension 21 forming a gauge cylinder having a bore 22 closed by plug 18. The end of duct 19 is counterbored to form a seat for a valve comprising an extension 23 on a hollow guide cylinder 24. The inner end of plug 18 is formed with a recess in which cylinder 24 is slidably mounted, and seated therein is a compression spring 25. The compression spring extends inside of an adjustable tube 26 which is slidably and rotatably mounted within the cylinder 21. The tube 26 extends beyond the cylinder and has a knurled head 27 for convenient adjustment of the tube. Formed in the cylinder is a longitudinal slot 28 having laterally extending branches at uniform intervals. These branches have scale markings 50, 55, 60, and increasing amounts toward the valve end of the cylinder. Mounted upon the tube 26 is a pin 29, which is slidably disposed in the slot 28 and will enter a branch slot. Assume that the pin 29 is in a branch slot as indicated in Fig. 1. To make an adjustment, the tube 26 is turned until pin 29 registers with slot 28. The tube may then be pushed inwardly so that the pin registers with a slot having a higher scale reading, or may be moved outwardly to a slot having a lower scale reading, as selected. The tube is then turned so that the pin enters the branch slot desired. This automatically locks the tube in position. By this means, the spring tension may be changed and the pressure upon valve cylinder 24 increased or decreased.

Communicating with the counterbore of plug 18 is an air port 30 leading to a whistle 31 of any convenient construction. When the extension 23 is moved from the enlarged end of duct 19, it places the latter and port 30 in communication so that the whistle is blown.

Assume that a pressure of 95 pounds is desired in the tire. The tube 26 is then adjusted so that pin 29 is in the branch slot marked 95. The connection is now slipped over the tire valve stem, which enters the opening 8 in the cap and is gripped by the washer 9. This makes an air tight joint. The end of valve 13 engages the stem of the tire valve, and the valve 14 is lifted from its seat, permitting air to enter through the nipple 6 into the tire. The pressure in chamber 15 is that of the tire and is communicated through passage 16, channel 17 and duct 19. The pressure acts upon valve extension 23, and when 95 pounds pressure has been reached in the tire valve, the pressure will be sufficient to raise the valve and uncover the duct 19. Air then passes through port 30 sounding the whistle. It is obvious that any adjustment for sounding of the whistle, may be made by simply turning the head 27 and moving the pin 29 into the desired branch slot.

In Fig. 4 a type of construction is shown adaptable for screwing onto the tire valve tube. In this construction, there is no valve interposed between the nipple 32 and the passage 33 which communicates directly with the tire valve. The pressure of the air from the hand pump is sufficient to unseat the tire valve. In order to provide means for attaching the body to the tire valve stem, a collar 34 is rotatably mounted upon the end of the body and is provided with an internal thread 35 for engagement with the tire valve stem. A washer 36 is also provided to seat upon the top of the tire valve stem and make an air tight joint. The other details of construction are substantially the same as those already described.

What I claim is:

1. In a device of the class described, the combination of a body, said body having an air inlet chamber provided with a port for communication with a body to be inflated, a gauge cylinder having a cylindrical bore communicating with said chamber, a valve slidably disposed in said bore, a spring holding said valve to its seat, said cylinder being provided with a slot having lateral branches, a slidable and rotatable member disposed in the end of said cylinder and having a pin disposed in said slot, said spring abutting said member, whereby the compression thereof may be varied, said cylinder being provided with an air port disposed to be uncovered by lifting of said valve.

2. In a device of the class described, the combination of a body, said body having an air inlet chamber provided with a port for communication with a body to be inflated, a gauge cylinder having a cylindrical bore communicating with said chamber, a valve slidably disposed in said bore, a spring holding said valve to its seat, said cylinder being provided with a slot having lateral branches, a tube slidably and rotatably disposed in the end of said cylinder and having a pin disposed in said slot, said spring extending into and abutting said tube, said cylinder being provided with an air port disposed to be uncovered by lifting of said valve.

In witness that I claim the foregoing I have hereunto subscribed my name this 6th day of November, 1920.

DOZIER THORNTON BENTLEY.